Figure 3:
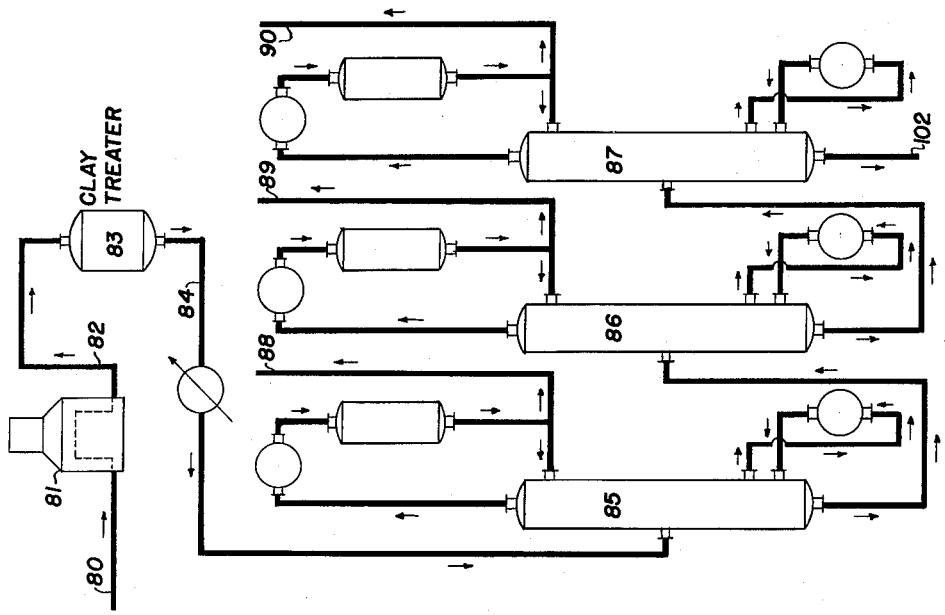

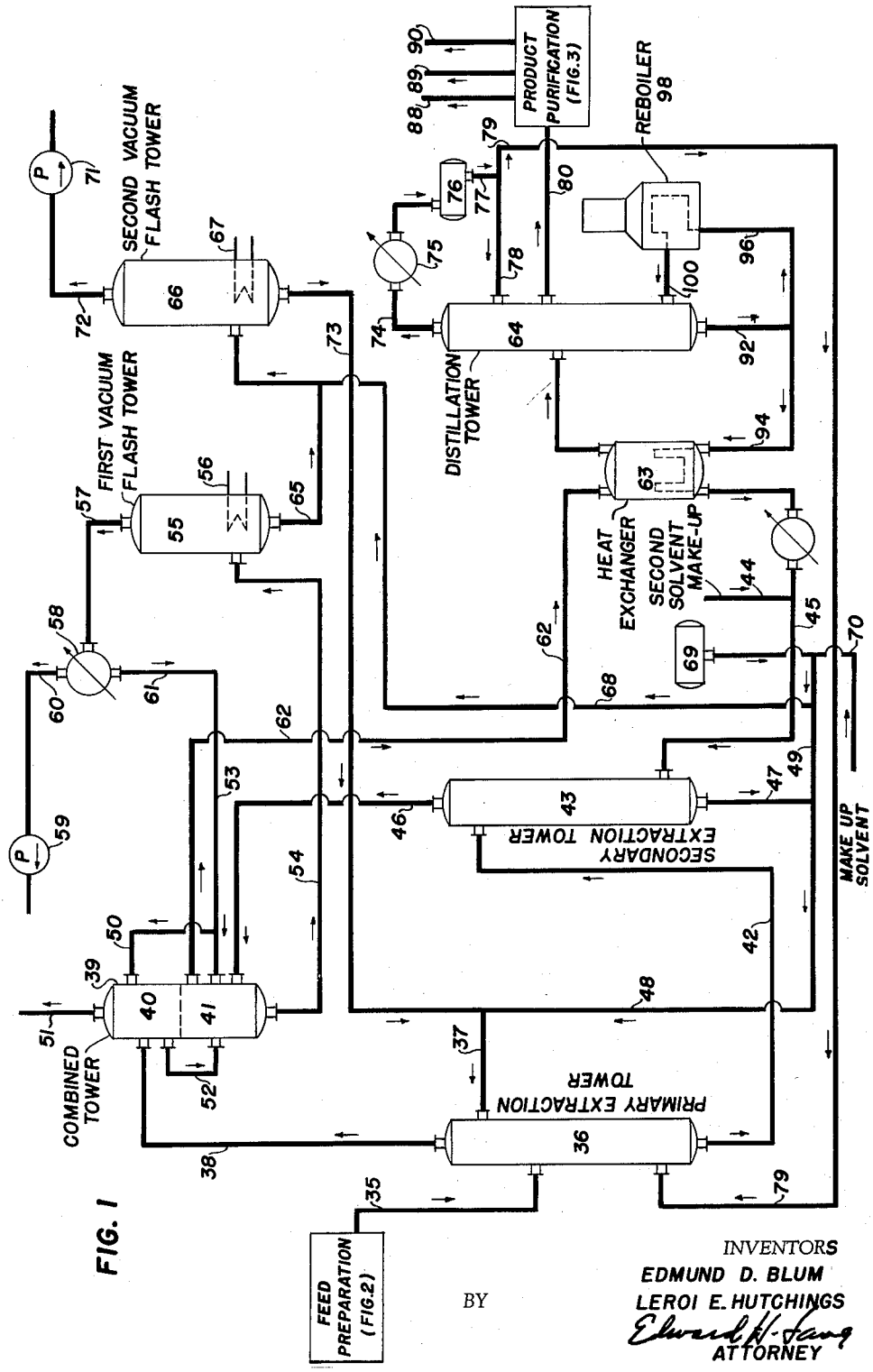

April 4, 1961  E. D. BLUM ET AL  2,978,520
PROCESS FOR RECOVERY OF AROMATIC HYDROCARBONS
Filed June 16, 1958  2 Sheets-Sheet 2

INVENTORS
EDMUND D. BLUM
LEROI E. HUTCHINGS
BY
Edward H. Lang
ATTORNEY

United States Patent Office 2,978,520
Patented Apr. 4, 1961

---

2,978,520

PROCESS FOR RECOVERY OF AROMATIC HYDROCARBONS

Edmund D. Blum, Elgin, and Le Roi E. Hutchings, Crystal Lake, Ill., assignors to The Pure Oil Company, Chicago, Ill., a corporation of Ohio Filed June 16, 1958, Ser. No. 742,121

15 Claims. (Cl. 260—674)

This invention relates to an extraction process for the recovery of aromatic hydrocarbons and alkylated homologues thereof from hydrocarbon mixtures containing same, using the following combination of techniques and improvements:

(1) The employment of a certain class of solvents which are particularly effective but are subject to some decomposition during use.

(2) The utilization of water-washing and auxiliary solvent-washing steps to recover the hydrocarbon fractions from the raffinate and extract phases, respectively.

(3) Close and automatic control of the amount of water in the recycled solvent by coordination of the water-washing and auxiliary solvent-washing steps in combination with a series of flash-vaporization steps, whereby solvent decomposition is controlled or eliminated entirely, build-up of high-boiling aromatics in the system is minimized, and heat requirements are reduced.

The solvent extraction art recognizes the differences in efficiency gained through the use of various solvents, phase-recovery procedures, and the numerous auxiliary techniques that are designed to recover the raffinates and extracts in greatest yields and purity. Whether vapor or liquid phase contact is made with the solvent, the main problem has always been the separation of the hydrocarbons from the separate phases, and recovery of the solvent for recycle in the system. The more effective the extraction characteristics of the solvent, the less ideal the solvent phase becomes and, consequently, the phase separation is correspondingly more difficult. Simple distillation or fractionation sometimes results in incomplete separation or contamination of the extract due to solvent decomposition at the temperature necessary to accomplish separation. Also, if the separation is not complete, the recycled solvent gradually loses its efficiency due to the accumulation of undesirable fractions therein. Where there is some contamination of the extract phase from the solvent extraction, separation of the unsaturates from the solvent is further complicated.

The use of water, or an auxiliary solvent, for treatment of either the extract or raffinate phases to accomplish separation introduces additional separating steps and added heat requirements. Often the solvent efficiency can be improved by using water therewith in the primary extraction, but this introduces the problems of controlling the water content, preventing its build-up in the system, and separating the water from the solvent before recycle, all of which operations require heat. The same is true of the use of an auxiliary solvent of a different boiling range to separate the aromatics from the extract phase. In each instance, the more the solvent is heated and cooled during the processing, the more the losses of solvent due to decomposition, contamination, and other sources, affect the efficiency of the process.

In accordance with this invention, the foregoing difficulties can be overcome by employing a series of related steps, hereinafter more clearly described, which allow the use of water dilution of the primary solvent, the use of an auxiliary or secondary solvent, and depend on a coordinated raffinate-wash and vacuum-flashing of combined water-wash streams under controlled conditions to increase the efficiency without additional heat requirements.

Accordingly, it becomes a primary object of this invention to provide a process for extracting aromatic hydrocarbons and alkyl homologues thereof from hydrocarbon mixtures containing same by applying a series of interrelated water-washing and vacuum-flashing steps in the solvent-recovery stage.

Another object is to provide a method of solvent extraction using decomposable carbamate-type solvents wherein decomposition or hydrolysis of the solvent is prevented and the water content of the recycle stream is automatically controlled.

Still another object is to provide a solvent extraction process wherein the hydrocarbon raffinate and extract phase recovery, and solvent purification, and recycle steps are simplified and correlated at a lower level of heat input for the system.

These and other objects of the invention will be related in whole or in part or become apparent from the description of the invention, particularly in relation to the examples and the attached drawing wherein is shown a general flow diagram of the process.

The solvents used in this invention are esters of carbamic acid and N-substituted carbamic acids, in which the ester group contains at least one polar constituent. These solvents possess good selectivities toward aromatics, whereas similar esters in which the ester group does not contain a polar group do not exhibit such selectivity. The compounds used may be represented by the general formula:

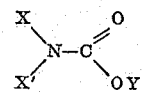

wherein X and/or X' are substituent groups which may broadly be hydrogen, alkyl groups, cycloalkyl groups, aryl groups, polar-substituted alkyl groups, polar-substituted aryl groups, and heterocyclic groups and Y is a polar-substituted alkyl, aryl, alkaryl aralkyl, or cycloalkyl group. More specifically X and/or X' may be selected substituents from the following groups: hydrogen, methyl, ethyl, propyl, isopropyl, butyl, isobutyl, tertiary butyl, amyl, isoamyl, cyclopentyl, cyclohexyl cycloheptyl, phenyl tolyl, xylyl, hydroxymethyl, hydroxyethyl, hydroxypropyl, hydroxyisopropyl, hydroxybutyl, hydroxyisobutyl, hydroxyamyl, hydroxyisoamyl, cyanomethyl, cyanoethyl, cyanopropyl, cyanobutyl, cyanoisobutyl, cyanoamyl, cyanoisoamyl, methoxymethyl, methoxyethyl, methoxypropyl, methoxyisopropyl, methoxybutyl, methoxyisobutyl, methoxyamyl, methoxyisoamyl, acetamidoethyl, acetamidopropyl, acetamidoisopropyl, acetamidobutyl, acetamidoisobutyl, acetamidoamyl, carboethoxyethyl, carboethoxypropyl, carboethoxyisopropyl, carboethoxybutyl and carboethoxyamyl. Additional specific substituent groups include nitrophenyl, i.e., 4-nitrophenyl, cyanophenyl, i.e., 4-cyanophenyl, morpholinyl, pyridyl and piperidinyl and the like.

Y in the above formula is a polar-substituted alkyl, aryl, alkaryl, aralkyl or cycloalkyl group including the aforementioned hydroxyalkyl, cyanoalkyl, methoxyalkyl, acetimidoalkyl and carboethoxyalkyl groups in relation to the definition of X and X'. Other polar groups that may be used in place of or along with the foregoing are the fluoro, chloro, iodo, and bromo groups.

Species under the above general formula include 2-hydroxyethyl N-methyl carbamate, 2-hydroxyethyl N,N-dimethyl carbamate, 2-hydroxyethyl N-i-propyl carbamate, 2-chloroethyl N,N-dimethyl carbamate, 2-bromoethyl N-i-propyl carbamate, and 2-chloroethyl N-i-butyl carbamate.

When the foregoing solvents are used in conventional extraction processes with from 5% to 25% of water, decomposition of the carbamate over a period of time is inevitable, the extent thereof and its effect on the process being dependent on the conditions imposed during the extraction and solvent recovery steps. At ambient temperatures, the hydrolysis of $\beta$-hydroxyethyl dimethyl carbamate, for example, in the presence of about $\frac{1}{4}$ of its volume of water is practically negligible, even where the contact is over extended periods of time. At temperatures above about 178° F., the hydrolysis reaction rate increases rapidly for this individual ester. In accordance with this invention, it has been found that by close control of the amount of water used, and the application of certain water-wash steps in conjunction with flash vaporization, the degree and rate of hydrolysis can be minimized or practically eliminated while at the same time effecting an overall heat saving in the process.

Since the hydrolysis reaction results in the production of the corresponding dialkyl ammonium dialkyl carbamate, that is, dimethyl ammonium dimethyl carbamate in the case of 2-hydroxy dimethyl carbamate, plus carbon dioxide and ethylene glycol, the reaction can be followed by the carbon dioxide pressure produced. Another decomposition reaction that may take p'ace is pyrolysis or heat decomposition, wherein, for example, $\beta$-hydroxyethyl dimethyl carbamate has been found to produce dimethyl ammonium dimethyl carbamate, ethylene glycol and $\beta$-dimethylaminoethanol. Since this reaction takes place at a very slow rate, it may be ignored in the ordinary use of the carbamate esters.

The process of this invention is best illustrated by reference to the attached drawings in which the various valves, pumps, and auxiliary equipment have been omitted for simplicity. The process will be described in relation to three phases, which include the feed preparation described in Figure 2, the extraction and solvent recovery to which the invention particularly relates as set forth in Figure 1 and the product purification as set forth in Figure 3.

Figure 2:
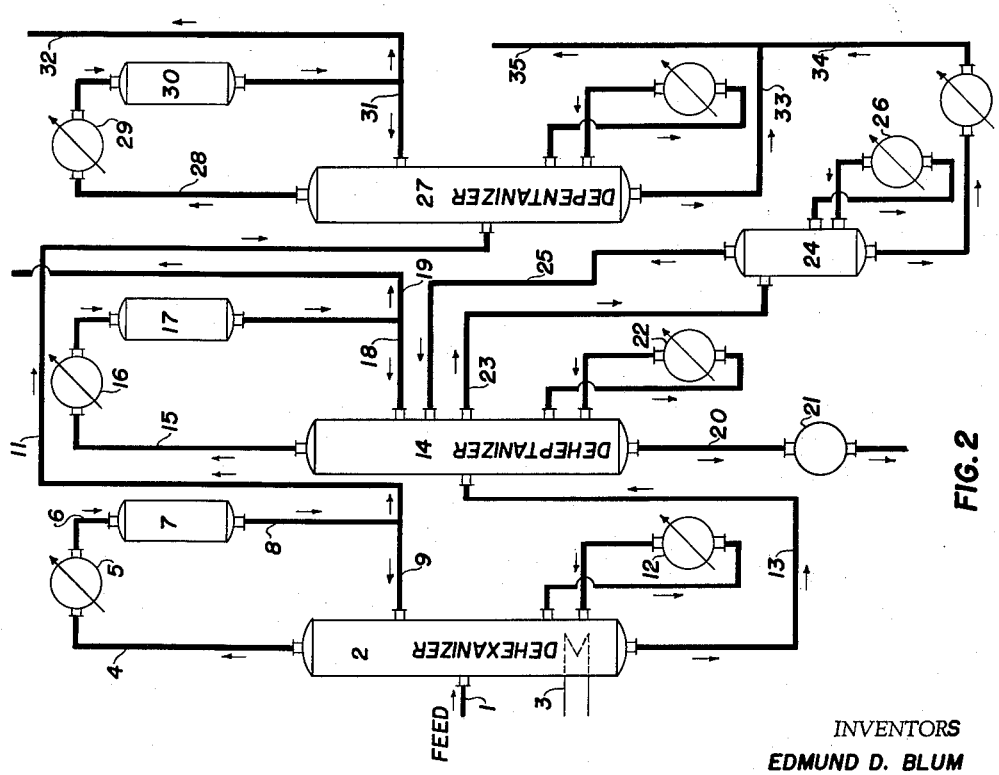

The feed stock, which may be a debutanized reformate, enters the process, Figure 2, through line 1 and flows to dehexanizer tower 2. The rate of flow in line 1 may be 12,500 b.p.s.d. Tower 2 is equipped with ordinary packing such as Raschig rings, Berl saddles, or distilling plates, and is heated by means of steam coil 3. Conditions are maintained in tower 2 for maximum separation of $C_5$ and $C_6$ hydrocarbons, passing over in line 4 to condenser 5, line 6, and separator 7. Effluent condensed pentanes and hexanes from separator 7 pass through line 8 into branch-line 9 for recycle to tower 2 and into branch-line 11. Reboiler 12 is provided in tower 2 to aid separation at the bottom of the tower.

Toluene and heavier components are withdrawn through line 13 to deheptanizer tower 14, from which heptanes are taken overhead through line 15, cooler 16, and separator 17, and are either recycled through line 18 or withdrawn via line 19. $C_{10}$-and-heavier reformate is withdrawn from tower 14 at line 20 and condenser 21. Reboiler 22 functions like reboiler 12. Side-stream 23, rich in toluene and xylene, is withdrawn from tower 14 to toluene-xylene stripper 24, from which the lighter materials are recovered and returned to tower 14 via line 25. Tower 24 is equipped with reboiler 26.

$C_5$ and $C_6$ hydrocarbons in line 11 pass to depentanizer tower 27 wherein pentanes are separated through line 28, condenser 29, and separator 30, and are either recycled through line 31 or removed by line 32. A benzene concentrate leaves tower 27 via line 33 and joins the toluene-xylene concentrate leaving tower 24, via line 34, to form the so-called BTX feed in line 35, comprising about 40% aromatics. This stream is fed to primary extraction tower 36 at a rate of about 4150 b.p.s.d.

Referring now to Figure 1, tower 36 is a conventional-type extraction tower operating at about 100° to 200° F., preferably at 120° F., and one atmosphere pressure. Solvent and water are introduced at line 37. The preparation and control of this solvent composition in line 37 constitutes a primary aspect of this invention. Counter-current contact of solvent and BTX in tower 36 results in a raffinate phase recovered at line 38, consisting essentially of non-aromatic hydrocarbons and a small amount of solvent and water which passes to combination separation and water-wash tower 39 having water-wash section 40 and separation section 41.

Extract phase, consisting essentially of aromatics, primary solvent and water, is transferred from tower 36 via line 42 to secondary extraction tower 43. In tower 43, the extract phase is counter-currently contacted with secondary solvent entering the system at lines 44 and 45. Tower 43 is operated under substantially the same conditions as tower 36. The secondary solvent is a non-polar neutral solvent having a preferential solubility for the aromatics in the extract phase and a boiling point substantially different from that of the aromatics to facilitate subsequent separation therefrom. Suitable secondary solvents will be described.

The extraction taking place in tower 43 results in a secondary extract phase, withdrawn at line 46, which is conveyed to section 41 of tower 39. This secondary extract phase consists essentially of secondary solvent, aromatics, and a small amount of primary solvent and water. A secondary raffinate is formed in tower 43, comprising essentially primary solvent and water, which is withdrawn at line 47. This stream passes into line 48 and is augmented by fresh solvent from line 49. Line 48 conveys a portion of the secondary raffinate back to tower 36 via line 37, and line 68 conveys a portion of the secondary extract to the so'vent-recovery system to be described.

Primary raffinate from tower 36 in line 38 enters section 40 of tower 39 at about 120° F. wherein it is counter-currently washed with water entering at line 50. Generally, only a small amount of wash water, about 1.0% by volume based on the hydrocarbon content of the raffinate stream, is to be used in section 40. It has been found that the use of a small amount of water, between about 1.0 and 3.0 volume percent, at this point along with thorough mixing in section 40, is adequate to remove the small amount of solvent in the raffinate phase, producing a refined raffinate at line 51. This results in a wash-water stream, drawn off at line 52, which can be used to advantage in section 41.

In section 41, the secondary extract stream from line 46 is washed with wash-water stream 52 and water entering at line 53. Streams 52 and 53 are introduced at those levels and at such rates in section 41 that the amount of dilution and description of phase separation is kept at a minimum. The total amount of water introduced at lines 52 and 53 is controlled to about 1.0 to 3.0 volume percent based on the hydrocarbon content of the secondary extract stream 46. The combined water-wash phases fall to the bottom of section 41, are withdrawn at line 54 and sent to a first vacuum flash-tower 55. Tower 55 is heated by means of steam coil 56 and is operated at about 130° to 150° F., preferably about 140° F., and a vacuum of about 100 mm. of Hg absolute. Under these conditions, most of the water is flashed off and taken as overhead in line 57 to condenser 58 connected to vacuum pump 59 by line 60. Condensed-water stream 61 results which is used in controlled quantities by passage into sections 40 and 41 through lines 50 and 53 as previously described. Any make-up water may be introduced in line 61.

This operation of tower 39 results in a water-washed mixture of aromatics and secondary solvent which is withdrawn from the top of section 41 at line 62 and sent through heat exchanger 63 to distillation column 64, which operation will be described. Substantially pure primary solvent is withdrawn from the bottom of first flash-tower 55, via line 56, and sent to second vacuum flash-tower 66 heated by steam coil 67. This stream is combined with a portion of fresh solvent from branch-line 68 leading from surge tank 69 for the purpose of adjusting the water content thereof to the optimum concentration for the primary extraction. Make-up solvent is added to the system at line 70. In second vacuum flash-tower 66 the final water removal from the solvent is accomplished. The extent of water removal in tower 66 is controlled by the heat input in coil 67 and by adjustment of vacuum created by pump or ejector 71 in draw-off line 72. Tower 66 is operated at about 130–150° F., preferably 140° F., under a vacuum of about 40 mm. Hg absolute. Primary solvent, with adjusted water content ranging from about 5% to 20% of water, is removed at line 73 and recycled to line 37 leading to the top of tower 36. Surge tank 69 is provided to accommodate any excess of solvent flowing from tower 43 over the amount required in tower 36, thus the flow in line 49 may be in either direction.

The water-washed mixture of aromatics and secondary solvent in line 62 passes through heat exchanger 63 to tower 64, wherein the aromatics are distilled from the secondary solvent. Part of the aromatics content is taken overhead through line 74, passed through condenser 75 to collect in surge tank 76. A condensate of benzene is withdrawn from surge tank 76 via line 77, and is divided into stream 78, for recycle to the tower 64, and line 79 for recycle to the bottom of primary extraction tower 36.

Toluene, xylene and the remainder of the benzene are withdrawn as a liquid phase side-stream from tower 64 through line 80, and are conducted to furnace 81 wherein this stream is heated to a temperature suitable for efficient clay treating. Bottoms from tower 64, comprising purified secondary solvent, are withdrawn via line 92 and passed either through line 94 to heat exchanger 63, or through line 96 into reboiler 98 and line 100 back to tower 64 for re-distillation.

Referring to Figure 3, the heated aromatics in line 80 flow through furnace 81 and pass via line 82 to clay-treater 83 wherein trace impurities and color bodies are removed by contact with clay. The clay-treater is operated at about 350° to 450° F., and preferably at about 400° F., under sufficient pressure to maintain the aromatics in liquid phase. The decolorized aromatics leave clay-treater 83 via line 84 to fractionators 85, 86 and 87, from which finished benzene is withdrawn at line 88, toluene is withdrawn at line 89, and xylene is withdrawn at line 90 as the primary products of the process. Based on the incoming feed of 12,500 b.p.s.d. of debutanized reformate, which results in the preparation of 4150 b.p.s.d. of a BTX feed, there results the production of 518 b.p.s.d. of benzene at 99.5% purity, 361 b.p.s.d. of toluene at 99.0% purity, and 722 b.p.s.d. of xylene at 98.0% purity. The remaining xylene and higher-molecular-weight aromatics are withdrawn at line 92. Fractionators 85, 86 and 87 are equipped with the usual overhead condensers and reboilers which need not be further described. A residual product suitable for gasoline blending is removed at line 102.

Extraction towers 36 and 43 are designed specifically to take advantage of the combination of properties possessed by the carbamate ester solvents to be used in this process. One of the significant advantages of the invention is the relatively low heat requirement in the solvent recovery section and in the distillation section. By way of comparison, the best known prior art process requires a total heat input of about 80 million B.t.u. per hour when the rate of feed input is 4150 b.p.s.d. The instant process requires a heat input of only about 60 million B.t.u. per hour at the same feed rate.

The principal reason for the lower heat requirement is that the water is not directly distilled from the primary solvent. The only water vaporization in the present process takes place in vacuum towers 55 and 66, where only very small quantities of water, in the order of about 0.5 to 5.0%, by volume, are removed. In the prior art processes a large amount of water is used with the solvent during the extraction and the aromatics are distilled directly from the extract phase. Because of the very nature of such a distillation, considerable quantities of water are taken overhead with the aromatics, thereby greatly increasing the heat requirements for the distillation. This large amount of water in the distilled aromatic mixture has a further disadvantage and raises the heat requirements still further, since this stream must be condensed and the water separated.

Although the use of the secondary-solvent extraction procedure for separating the aromatic from the extract phase is a conventional procedure, the instant invention augments this practice by applying the process to solvents which are somewhat thermally unstable and substitutes the unique water-washing and vacuum-flashing steps in combination therewith where distillation has been used in the prior art. The present invention is limited, therefore, to the use of solvents of the carbamate-ester-type, which have an extremely high solubility in water. Thus, by the use of the two-stage vacuum-flashing, the instant process avoids subjecting the primary solvent to elevated temperatures which may cause its decomposition or hydrolysis, and also maintains the overall cost at a low level.

As an illustrative example of the invention, a primary solvent mixture comprising N-substituted 2-hydroxyethyl carbamate and water in volume ratios of about 1.5 to 2.5 parts of water to 8.5 to 7.5 parts of carbamate is introduced at line 37 to the top of tower 36. The ratio of solvent to feed entering at line 25 is adjusted to between about 5/1 and 7/1. Primary extraction tower 36 is a conventional perforated plate or packed column about 10 feet in diameter and 100 feet tall. Secondary extraction column 43 is also conventional and about 12 feet in diameter and 50 feet tall. The secondary solvent introduced at line 45 is a thermally stable, paraffinic naphtha having an initial boiling point greater than 400° F. Where benzene production is the primary objective, the initial boiling point of the paraffinic naphtha may be as low as 350° F. The boiling point of the paraffinic naphtha may be as low as 425° F. where xylene production is the ultimate desired result.

A reformate feed containing about 4.0% benzene, 13.0% toluene and about 16.0% of mixed xylene and ethylbenzene is used as the feed in line 35. By operating tower 36 at a temperature of about 120° F. at one atmosphere pressure, and secondary extraction tower 43 under the same conditions, while applying 1.0% by volume of water (based on the hydrocarbon content of the raffinate in line 38) in wash section 40 maintained at 120° F., and using a 2.0% by volume water wash (line 46, based on the hydrocarbon content of the secondary extract from tower 43), vacuum-flashing conditions of 140° F. and 40 mm. (Hg) pressure in tower 55, and 145° F. at the same pressure in tower 66, about 500 b.p.s.d. of benzene at 99.5% purity, about 350 b.p.s.d. of toluene at 99.0% purity and 722 b.p.s.d. of xylene at 98.0% purity is produced from about 4100 b.p.s.d. of BTX feed. A heat saving of some 20 million B.t.u. per hour is experienced over a conventional procedure wherein excess water is used in the washing stage and the solvent is recovered by distillation. Substantially no decomposition of the carbamate solvent is experienced and no high-boiling aromatics accumulate in the system. The preferred secondary solvent is an alkylate prepared from the reaction of isobutane and butylene in the presence of sulfuric acid at about 30° F. and 50 p.s.i.g., which alkylate has an API gravity of about 54°, a boiling range of 400°–450° F. and contains about 60% paraffins. Other predominantly paraffinic hydrocarbons or naphtha fractions boiling from about 50° F. to 200° F. above the boiling point of the aromatics to be recovered may be used. Various known organic solvents having an affinity for aromatic-type hydrocarbons and satisfying the above boiling range differential may also be used as the secondary solvent.

The process of this invention is applicable to the treatment of any type of hydrocarbon mixture from which economical amounts of aromatics, including benzene and alkyl homologues thereof, can be recovered. Such mixtures include products obtained from aromatization and similar reactions. The products obtained from catalytic reforming, hydrocracking and dehydrocyclization processes may be used, as feed for the present process. Any mixtures containing a paraffinic- or naphthenic-type hydrocarbons admixed with benzene, toluene, xylenes, and ethylbenzene, as simple or complex multi-component mixtures, may be used as the starting material. Such feed materials as petroleum distillates, naphthas, gasoline, kerosene, fuel oil fractions, and gas-oil fractions may be used. The charge material should be liquid at ordinary temperatures and not subject to decomposition at the extraction temperatures or reaction with the selective solvents used herein. One suitable charge oil is in the class of products known in the art as catalytic reformates. These liquid products contain a fair concentration of desirable aromatic hydrocarbons. Catalytic reformates are obtained by subjecting naphthas to reforming, dehydrogenation, hydrocracking and dehydrocyclization processes at temperatures ranging from 850° F. to about 1000° F., with pressures up to 500 p.s.i.g., in the presence of a metal-containing catalyst.

As a more specific illustration, catalytic reformates obtained as a result of the treatment of a virgin naphtha (B. 175° F.–400° F., API gravity 50° to 60°) with a platinum-alumina catalyst at 875° F. to 975° F. and pressures ranging from 200 to 500 p.s.i.g. may be used. Reformates so produced contain from about 30 to 55 vol. percent of aromatics and constitute a preferred feed for the present process. For example, reformates produced by reforming a 200°–400° F. virgin naphtha at about 930° F. and 325 p.s.i.g., in the presence of a catalyst comprising about 0.1 wt. percent of platinum on an alumina base, are representative. In general, these reformates have a boiling range of about 125° to 400° F., an API gravity of 40° to 50°, and an aromatic content of 45–55 volume percent. A particularly suitable reformate is obtained by subjecting a charge naphtha having a boiling range of 178° F. to 389° F., an API gravity of 59.1°, a RON, clear, of 44.6, a RON+0.3 TEL of 71.4, and containing 0.01% sulfur, about 91.0 vol. percent of paraffins and naphthenes, 1.0 vol. percent olefins, and 8.0 vol. percent aromatics, to reforming at about 930° F. to produce a product having an API gravity of 49.2°, IBP of 128° F., EBP of 405° F., a RON, clear, of 89.4, a RON+.3 cc. TEL of 98.2, and containing about 48.0 vol. percent paraffins and naphthenes, 1.0 vol. percent olefins and 51.0 vol. percent of aromatics. By precise fractionation and blending to different octane numbers, it was determined that this reformate product exhibited the following analysis:

TABLE I

Aromatics in reformate

| Aromatic: | Vol. percent |
|---|---|
| Benzene | 4.19 |
| Toluene | 13.1 |
| Mixed xylene and ethylbenzene | 16.51 |
| C₉ and heavier | 17.2 |

Examples of the composition of other reformate products that may be used are shown in Table II giving the volume percent of aromatics in each, and the research octane level to which the reforming process was directed in each instance.

TABLE II

Aromatics distribution in various reformates [1]

[Volume percent]

| Aromatic | 85 Research Octane Level | 95 Research Octane Level |
|---|---|---|
| Benzene | 2.96 | 3.41 |
| Toluene | 9.64 | 12.9 |
| Ethyl-benzene | 2.55 | 2.72 |
| p-Xylene | 2.74 | 2.83 |
| m-Xylene | 6.45 | 6.73 |
| o-Xylene | 3.96 | 3.81 |
| C₉ and heavier aromatics | 17.3 | 22.4 |
| Total | 45.6 | 54.8 |

[1] These reformate products were from different feed stocks.

In general, these feed stocks contain a mixture in various proportions of i-butane, n-butane, i-pentane, n-pentane, cyclopentane, 2,2-dimethylbutane, 2,3-dimethylbutane, 2-methylpentane, 3-methylpentane, n-hexane, methylcyclopentane, 2,2-dimethylpentane, benzene, 2,4-dimethylpentane cyclohexane, 2,2,3-trimethylbutane, 3,3-dimethylpentane, 1,1-dimethylcyclopentane, 2,3-dimethylpentane, 2-methylhexane, cis-1,3-dimethylcyclopentane, trans-1,2-dimethylcyclopentane, 3-ethylpentane, n-heptane, 2,2,4-trimethylpentane, cis-1,2-dimethylpentane, methylcyclohexane, methylethylcyclopentane, and other C₈ hydrocarbons, toluene, ethylbenzene, p-xylene, o-xylene and m-xylene. These represent the types of hydrocarbon mixtures from which the aromatics, as enumerated, can be separated by the present process. In using reformates as feed hydrocarbons, one purpose is to separate the low-octane components so that they may be recycled or otherwise upgraded in octane number, and the high-octane product recovered for gasoline blending.

Another type of feed mixture comprises various fractions and mixtures of fractions of reformates which may be used in this invention. For example, a reformate or other source of aromatics may be fractionated to form a benzene concentrate, a toluene concentrate and a xylene concentrate; these may be individually treated or mixed in various proportions and treated to solvent extraction in accordance with this invention to obtain products having a high concentration of the desired aromatic. One such feed material comprises a synthetic mixture of 1 part benzene concentrate, 2 parts toluene concentrate and 1 part xylene concentrate. The purpose of treating such concentrates is to recover aromatics of maximum purity for use as organic intermediates, solvents, etc.

Regarding the function of sections or contact zones 40 and 41, it has been found expedient for the proper separation of phases therein to control two factors, namely, the total concentration of water, which is maintained at a relatively low value of between 1.0 to 3.0 volume percent based on the total hydrocarbon content in said zones, and the avoidance of the introduction of overhead water from line 61, or water-solvent phase in line 52, at levels in zone 41 where substantially pure hydrocarbon phase exists (high in the zone) or substantially pure water phase exists (low in the zone). This precaution has been found to greatly facilitate the speed and certainty of phase separations taking place. There will exist at any given moment and under prescribed operating conditions a high concentration of water at the bottom of zone 41 from which stream 54 is being taken, and also a low concentration of water at the top of zone 41 from which stream 62 is taken. The point of entry of line 52, through which the water-solvent stream from zone 40 is passing and which contains a maximum of about 3.0 volume percent of water, is located at a position along the height of zone 41 such that the water concentration therein is substantially the same, that is, about 3.0% by volume as a maximum. This is controlled by a manifold arrangement of a plurality of entry points for line 52 into zone 41. Since other arrangements may be used, no attempt has been made to show such manifolding in the drawing.

Control of the level of equal hydrocarbon concentration is had by the rate of introduction of second extract phase from line 46, which contains less than about 3.0 volume percent of water. This means that automatically a maximum of only about 5.0 volume percent, and more nearly only 2.5 volume percent, of water need be flash-vaporized from the solvent phase coming from line 54 and a minimum of heat input is necessary at coils 56 and 67. Other advantages include the prevention of azeotrope formation and the use of lower temperatures during solvent recovery to prevent decomposition of the solvent. Practically no increase in temperature is needed to remove up to 5.0 volume percent of water in towers 55 and 66, to keep the overall mixture of solvent and water at line 37 within the limits of about 5.0 to 25% volume percent. The application of a vacuum alone will remove over 1.0 volume percent of this water. Once a balance is struck between the rate of introduction of water in zone 40, the rates of water removal and water introduction at lines 50 and 53, the system maintains itself as long as the amount of water added to the make-up solvent is kept constant or adjusted only to off-set small unavoidable losses of water and solvent. These results are accomplished by maintaining intimate contact of the phases in zones 40 and 41 with adequate separation at the points of withdrawal. Since various devices are available to accomplish the desired mixing and phase separation, they need not be described in detail herein.

The system also avoids the necessity of a separate solvent recovery system for the small amount of solvent in the first raffinate phase (38). This is only possible by using a maximum of only about 3.0 volume percent of water, based on the total hydrocarbon content, in each of the contact zones 40 and 41. As soon as this maximum is exceeded, the water-solvent stream 54 contains over 30 percent by volume of water, requiring the application of longer heating periods and imposing optimum conditions for hydrolysis or thermal decomposition of the solvent.

Although the invention has been described by specific illustrations and examples, the only limitations attaching thereto appear in the appended claims.

What is claimed is:

1. A process for the separation of aromatic hydrocarbons from a mixture of hydrocarbons containing same which comprises treating said mixture with an aqueous solvent to form a first raffinate phase and a first extract phase, said solvent consisting of N-substituted carbamates having at least one polar substituent and being characterized by its instability in the presence of water and heat, separating the first raffinate phase and the first extract phase, contacting said raffinate phase with water in a first contact zone to form a solvent-free raffinate phase and a water-solvent phase, contacting said first extract phase with a secondary solvent having a boiling point substantially above that of the aromatic hydrocarbon sought in said first extract phase to form a second raffinate phase and a second extract phase, contacting said second extract phase with the water-solvent phase from said first contact zone in a second contact zone to recover a purified second extract phase and a combined water-solvent phase, flash-vaporizing said combined water-solvent phase to reconstitute said aqueous solvent to its original composition, recovering overhead water from said flash vaporization, returning said overhead water to said first and second contact zones at a rate sufficient to maintain the total water contents therein at about 1.0 to 3.0 volume percent of the total hydrocarbon content of each of said contact zones, and recovering said aromatic hydrocarbons from said purified second extract phase.

2. A process for the separation of aromatic hydrocarbons from a mixture of hydrocarbons containing same which comprises treating said mixture with an aqueous solvent to form a first raffinate phase and a first extract phase, said solvent consisting of N-substituted carbamates having at least one polar substituent and being characterized by its instability in the presence of water and heat, separating the first raffinate phase and first extract phase, contacting said raffinate phase with water in a first contact zone to form a solvent-free raffinate phase and a water-soluble phase, contacting said first extract phase with a secondary solvent having a boiling point substantially above that of the aromatic hydrocarbons sought in said first extract phase to form a second raffinate phase and a second extract phase, contacting said second extract phase with the water-solvent phase from said first contact zone in a second contact zone to recover a purified second extract phase and a combined water-solvent phase, subjecting said combined water-solvent phase to flash vaporization at reduced pressure to reconstitute said aqueous solvent to its original composition, recovering overhead water from said flash vaporization, returning a portion of said overhead water to said first contact zone at a rate sufficient to maintain the total water content in said first contact zone at about 1.0 to 3.0 volume percent based on the hydrocarbon content of said raffinate phase, returning another portion of said overhead water to said second contact zone at a rate sufficient to maintain the total water content in said second contact zone at about 1.0 to 3.0 volume percent based on the hydrocarbon content of said extract phase, and recovering said aromatic hydrocarbons from said purified second extract phase.

3. A process for the separation of aromatic hydrocarbons from a mixture of hydrocarbons containing same which comprises treating said mixture with an aqueous solvent to form a first raffinate phase and a first extract phase, said solvent consisting of N-substituted carbamates having at least one polar substituent and being characterized by its instability in the presence of water and heat, separating a first raffinate phase and first extract phase, contacting said raffinate phase with about 1.0 to 3.0 volume percent of water based on the hydrocarbon content of said raffinate phase in a first contact zone to form a solvent-free raffinate phase and a water-solvent phase, contacting said first extract phase with a secondary solvent having a boiling point substantially above that of the aromatic hydrocarbons sought in said extract phase to form a second raffinate phase and a second extract phase, contacting said second extract phase with said water-solvent phase in a second contact zone to recover a purified second extract phase and a combined water-solvent phase, subjecting said combined water-solvent phase to flash vaporization at reduced pressure to reconstitute said aqueous solvent to its original composition, recovering water as overhead from said flash vaporization, returning a portion of said overhead water to said first contact zone, returning a second portion of said overhead water to said second contact zone, said second portion of overhead water being adjusted so that the total amount of water present in said second contact zone is about 1.0 to 3.0 volume percent of the hydrocarbon content of said second extract phase, and recovering said desired aromatic hydrocarbons from said purified second extract phase.

4. A process for the separation of aromatic hydrocarbons from mixture of non-aromatic hydrocarbons containing same which comprises treating said mixture with an aqueous solvent consisting of an N-substituted carbamate having at least one polar substituted to form a first raffinate phase and a first extract phase, said carbamate solvent being characterized by its instability in the presence of water and heat, separating a first raffinate phase and first extract phase, contacting said raffinate phase with about 1.0 to 3.0 volume percent of water based on the hydrocarbon content of said raffinate phase in a first contact zone to form a solvent-free raffinate phase and a water-solvent phase, contacting said first extract phase with a secondary solvent having an affinity for said aromatic hydrocarbons and being separable therefrom to form a second raffinate phase and a second extract phase, contacting said second extract phase with said water-solvent phase in a second contact zone to recover a purified second extract phase and a combined water-solvent phase, subjecting said combined water-solvent phase to flash vaporization at reduced pressure to reconstitute said aqueous N-substituted carbamate solvent to its original composition, recovering water as overhead from said flash vaporization, returning a portion of said overhead water to said first contact zone, returning a second portion of said overhead water to said second contact zone, adjusting the rates of introduction of said overhead water to said contact zones so that the total amount of water present in said contact zones is about 3.0 volume percent of the hydrocarbon content of said zones and recovering aromatics from said purified second extract phase.

5. The method in accordance with claim 4 in which the N-substituted carbamate solvent has the general formula:

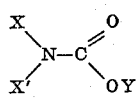

wherein X and X' are the same or different substituent radicals selected from the group consisting of hydrogen, alkyl, cycloalkyl, aryl, alkaryl, aralkyl, polar-substituted alkyl, polar-substituted aryl and heterocyclic groups, and Y is selected from the group of polar-substituted alkyl, polar-substituted aryl, polar-substituted alkaryl, polar-substituted aralkyl and polar-substituted cycloalkyl groups.

6. The process in accordance with claim 5 in which said carbamate ester is 2-hydroxyethyl N-methyl carbamate.

7. The process in accordance with claim 5 in which said carbamate ester is 2-hydroxyethyl N,N-dimethyl carbamate.

8. The process in accordance with claim 5 in which said carbamate ester is 2-hydroxyethyl N-isopropyl carbamate.

9. The process in accordance with claim 5 in which said carbamate ester is 2-chloroethyl N,N-dimethyl carbamate.

10. The process in accordance with claim 5 in which the carbamate ester is 2-bromoethyl N,N-dimethyl carbamate.

11. A process for the separation of aromatic hydrocarbons from mixtures of non-aromatic hydrocarbons containing same which comprises treating said mixture with an N-substituted polar carbamate solvent containing from 5% to 25% by volume of water at a temperature of about 100° to 200° F. to form a first raffinate phase and a first extract phase, said carbamate solvent being characterized by its instability in the presence of water and heat, separating a first raffinate phase and a first extract phase, contacting said raffinate phase at the extraction temperature with about 1.0 to 3.0 volume percent based on the hydrocarbon content of said raffinate phase of overhead water, produced hereinafter, in a first contact zone to form a solvent-free raffinate and a water-carbamate solvent phase, contacting said first extract phase with a secondary hydrocarbon solvent having an affinity for said aromatic hydrocarbons and being separable therefrom to form a second raffinate phase and a second extract phase, contacting said water-carbamate solvent phase with said second extract phase in a second contact zone together with overhead water, hereinafter produced, to recover a purified second extract phase and a combined water-carbamate solvent phase, subjecting said combined water-carbamate solvent phase to flash vaporization at a temperature sufficient to remove a maximum of about 5.0 volume percent of water therefrom to reconstitute same, recovering overhead water from said flash vaporization, recycling said overhead water to said first and second contact zones, controlling the point of entry of said water-carbamate solvent phase in said second contact zone whereby same is introduced into said zone at a level of substantially the same water concentration as is present in said water-carbamate solvent phase, said concentration not to exceed about 3.0 volume percent based on the total hydrocarbon concentration in said second contact zone, recycling said reconstituted carbamate solvent to said extraction step without loss due to decomposition, and recovering said aromatic hydrocarbons from said purified extract phase.

12. The process in accordance with claim 11 in which said hydrocarbon solvent is a paraffinic alkylate boiling in the range of about 400° to 450° F.

13. The process in accordance with claim 11 in which said hydrocarbon mixture containing aromatics is a catalytic reformate.

14. The process in accordance with claim 11 in which said hydrocarbon mixture comprises a catalytic reformate containing benzene, toluene and xylenes.

15. The process in accordance with claim 14 in which said catalytic reformate is treated to remove $C_5$ to $C_7$ paraffins therefrom prior to solvent extraction and the extract phase produced is distilled to separate benzene, toluene and xylenes as the products.

References Cited in the file of this patent

UNITED STATES PATENTS

| | | |
|---|---|---|
| 2,246,297 | Duncan et al. | June 17, 1941 |
| 2,342,205 | Manley | Feb. 22, 1944 |
| 2,344,406 | Hibshman | Mar. 14, 1944 |
| 2,444,582 | Smith | July 6, 1948 |
| 2,594,044 | Loder | Apr. 22, 1952 |
| 2,727,848 | Georgian | Dec. 20, 1955 |
| 2,886,610 | Georgian | May 12, 1959 |